United States Patent
Tsuchiya et al.

(10) Patent No.: US 9,518,503 B2
(45) Date of Patent: Dec. 13, 2016

(54) COOLING WATER CONTROL VALVE APPARATUS

(71) Applicants: Toru Tsuchiya, Odawara (JP); Takumi Oikawa, Odawara (JP); Masayuki Daikuhara, Odawara (JP); Hiromasa Ogawa, Hamamatsu (JP); Masaki Teshi, Hamamatsu (JP)

(72) Inventors: Toru Tsuchiya, Odawara (JP); Takumi Oikawa, Odawara (JP); Masayuki Daikuhara, Odawara (JP); Hiromasa Ogawa, Hamamatsu (JP); Masaki Teshi, Hamamatsu (JP)

( * ) Notice: Subject to any disclaimer, the term of this patent is extended or adjusted under 35 U.S.C. 154(b) by 639 days.

(21) Appl. No.: 13/774,040

(22) Filed: Feb. 22, 2013

(65) Prior Publication Data

US 2013/0221116 A1 Aug. 29, 2013

(30) Foreign Application Priority Data

Feb. 28, 2012 (JP) ................................. 2012-041525

(51) Int. Cl.
*F01P 7/14* (2006.01)
*F01P 7/16* (2006.01)
(Continued)

(52) U.S. Cl.
CPC .. *F01P 7/14* (2013.01); *F01P 7/16* (2013.01); *G05D 23/134* (2013.01); *F01P 11/16* (2013.01);
(Continued)

(58) Field of Classification Search
CPC ....... G05D 23/134; F01P 7/16; F01P 2060/18; F01P 2060/45; F01P 2003/027; F01P 11/16; F01P 11/18; F01P 7/14
See application file for complete search history.

(56) References Cited

U.S. PATENT DOCUMENTS 4,741,293 A * 5/1988 Itoh ........................... F01P 3/02
123/41.44
4,964,371 A * 10/1990 Maeda .................... F01P 7/167
123/41.1
(Continued)

FOREIGN PATENT DOCUMENTS

DE 102009009854 A1 * 9/2010
JP 2002227648 A * 8/2002
(Continued)

OTHER PUBLICATIONS

Notice of Reasons for Rejection dated Jan. 5, 2016, issued in counterpart Japanese Application No. 2012-041525, with English translation (8 pages).
(Continued)

*Primary Examiner* — Len Tran
*Assistant Examiner* — Kun Kai Ma
(74) *Attorney, Agent, or Firm* — Westerman, Hattori, Daniels & Adrian, LLP (57) ABSTRACT

A cooling water control valve apparatus capable of independently controlling flow rates of cooling water in two lines with a single apparatus for cooling water control and capable of achieving cost reduction.

A cooling water control valve apparatus which adjusts a flow rate of cooling water for cooling an object to be cooled includes two inlet ports through which cooling water is introduced, an electrical control valve which is arranged at a first passage communicated with one of the inlet ports and which adjusts a flow rate of cooling water flowing through the first passage with electronic control, and a thermosensitive valve which is arranged at a second passage communicated with the other of inlet ports and which adjusts a flow (Continued)

rate of cooing water flowing through the second passage owing to displacement of a temperature detecting medium with temperature.

2 Claims, 3 Drawing Sheets

(51) Int. Cl.
   *G05D 23/13* (2006.01)
   *F01P 11/16* (2006.01)
   *F01P 11/18* (2006.01)
   *F01P 3/02* (2006.01)

(52) U.S. Cl.
   CPC ........... *F01P 11/18* (2013.01); *F01P 2003/027* (2013.01); *F01P 2060/045* (2013.01); *F01P 2060/18* (2013.01)

(56) References Cited

U.S. PATENT DOCUMENTS

| | | | | |
|---|---|---|---|---|
| 5,279,265 | A * | 1/1994 | Matsuo | F01P 5/10 123/195 C |
| 6,343,573 | B1 * | 2/2002 | Takahashi | F01P 7/167 123/41.08 |
| 6,371,060 | B1 * | 4/2002 | Lehmann | F01P 7/167 123/41.1 |
| 6,539,899 | B1 * | 4/2003 | Piccirilli | F01P 7/167 123/41.08 |
| 2007/0137592 | A1 * | 6/2007 | Hanai | F01P 11/20 123/41.14 |
| 2009/0065172 | A1 * | 3/2009 | Vacca | F16K 11/085 165/41 |
| 2009/0301414 | A1 * | 12/2009 | Netsu | 123/41.72 |

FOREIGN PATENT DOCUMENTS

| | | | |
|---|---|---|---|
| JP | 2003-148145 | A | 5/2003 |
| JP | 2004-270652 | A | 9/2004 |
| JP | 2010-528229 | A | 8/2010 |
| WO | 2008/029029 | A1 | 3/2008 |

OTHER PUBLICATIONS

English translation of Notice of Reasons for Rejection dated Mar. 4, 2016, issued in counterpart Japanese Application No. 2013100611176 (1page).

* cited by examiner

COOLING WATER CONTROL VALVE APPARATUS

FIELD OF THE INVENTION

The present invention relates to a cooling water control valve apparatus which controls cooling water to cool an engine of an automobile, or the like.

BACKGROUND OF THE INVENTION

In an engine of an automobile or the like, as targeting improvement of fuel consumption due to improvement of engine warming-up performance and engine operation at appropriate temperature and the like, it has been considered to control an amount of cooling water to be cooled by a radiator owing to that a bypass passage to return cooling water directly to the engine as bypassing the radiator is arranged in addition to a main passage for circulating cooling water between the engine and the radiator and that an opening of a cooling water control valve which is arranged at the main passage is adjusted in accordance with cooling water temperature and other values. For example, at the time of engine starting having low cooling water temperature, engine warming-up is to be accelerated by closing the main passage and returning cooling water directly to the engine through the bypass passage without passing through the radiator. Further, for example, opening and closing (an opening degree) of the cooling water control valve is adjusted to control temperature of cooling water so as to improve fuel combustion of the engine after warming-up thereof.

For example, a rotary type valve which is driven with a stepping motor, a thermostat type valve which is operated with temperature and the like have been considered for such a cooling water control valve. Here, the thermostat type (thermosensitive type) valve denotes a valve having a thermostat, thermo-wax or the like to be displaced with temperature and being operated to be opened and closed with the displacement due to temperature.

Here, when the cooling water control valve becomes inactive in a closed state by any chance, cooling water is to be circulated in the engine through the bypass passage without being cooled by the radiator and cooling water temperature is increased. In this case, there is a possibility that the engine is overheated with continuous operation thereof. Accordingly, there has been proposed to circulate cooling water to a radiator side with a valve having a thermal safety device which is operated separately from a cooling water control valve when temperature of cooling water is increased owing to inactiveness or the like of the cooling water control valve in a closed state (see Patent Literature 1).

That is, the valve having the thermal safety device is a fail-safe mechanism. Here, the valve having the thermal safety device is a device using a thermally-displaced device formed of a thermostat, thermo-wax, shape-memory alloy, a combination of a spring and alloy to be melted at predetermined temperature, for example. When cooling water temperature is increased to the set temperature or higher, the device is displaced with temperature and the valve is to be in an opened state.

By the way, water jackets to circulate cooling water to an outer face side of an engine are arranged in the engine for cooling the engine. For example, a water jacket is arranged at a cylinder block of the engine and a water jacket is arranged at a cylinder head which is fixed to the cylinder block. In this case, cooling water is required to be circulated against the radiator for cooling the engine by causing cooling water to inflow to the water jacket at the cylinder block side and the water jacket at the cylinder head side and to outflow therefrom.

Here, during engine operation, improvement of fuel consumption of a vehicle is expected owing to that temperature of cooling water in the water jacket at the cylinder head side and temperature of cooling water in the water jacket at the cylinder block side are controlled to be different in temperature. Accordingly, in consideration of effectively cooling the cylinder head and the cylinder block as targeting improvement of fuel consumption, it is considered that circulation of cooling water is controlled separately. In this case, it is considered that cooling water control valves are arranged respectively to the water jacket at the cylinder head side and the water jacket at the cylinder block side, for example.

CITED LITERATURE

Patent Literature

Patent Literature 1: Japanese Patent Application Laid-Open No. 2010-528229

SUMMARY OF THE INVENTION

Problems to be Solved by the Invention

In a case that cooling water control valves are arranged respectively to the water jacket at the cylinder head side and the water jacket at the cylinder block side as described above, cost is increased. In particular, when the above-mentioned fail-safe mechanisms are arranged respectively, there is large influence to cost.

Further, according to Patent Literature 1, when a main control valve becomes in a closed state, flow of cooling water in a passage from an engine to a cooling water control valve is stopped and flow in a passage of a thermal safety device branched from the passage is stopped similarly. Accordingly, there occurs temperature difference between temperature of cooling water circulating in the engine and temperature detected by the thermal safety device. That is, there occurs large temporal difference between increase of cooling water temperature in the engine and increase of cooling water temperature at the cooling water control valve in a closed state. According to the above, there arises a problem as well that temperature of cooling water in the engine cannot be instantly detected at the thermal safety device. Accordingly, in a case of occurrence of a defect such that the cooling water control valve becomes inactive in a closed state, there is a fear that the engine is overheated owing to operational delay of the thermal safety device.

To address the above issues, the present invention provides a cooling water control valve apparatus which is capable of independently controlling flow rates of cooling water in two lines with a single apparatus and capable of appropriately performing flow rate control of cooling water in the two lines.

Means to Solve the Problems

To address the above issues, the present invention provides a cooling water control valve apparatus which adjusts a flow rate of cooling water for cooling an object to be cooled. The cooling water control valve apparatus includes two inlet ports through which cooling water is introduced, an electrical control valve which is arranged at a first passage communicated with one of the inlet ports and which adjusts a flow rate of cooling water flowing through the first passage with electronic control, and a thermosensitive valve which is arranged at a second passage communicated with the other of inlet ports and which adjusts a flow rate of cooing water flowing through the second passage owing to displacement of a temperature detecting medium with temperature.

According to the above structure, a flow rate of cooling water can be controlled for each of the two inlet ports. Further, flow rates of cooling water at two sections which are adjacent or close to each other can be controlled separately with the single cooling water control valve apparatus. In this case, compared to a case using two cooling water control valve apparatuses, cost reduction can be achieved while operability of assembling the cooling water control valve apparatus to the object can be improved, for example.

Further, since the electronic control valve is arranged at one inlet port, flow rate adjustment of cooling water can be finely set and promptly performed against temperature variation of the object. In contrast, since the thermosensitive valve is arranged at the other inlet port, relatively rough control is to be performed with displacement of a temperature detecting medium due to temperature.

That is, different types of control can be adopted in accordance with uses and characteristics of two sections, so that flow rate control of cooling water can be performed in accordance with uses and characteristics of the two sections.

Further, cost reduction can be achieved compared to a case of using electronic control valves for all sections.

For example, since electronic control is not performed, the thermosensitive valve does not require electronic devices therefor and control programs used for such electronic devices. Accordingly, compared to a case that electronic control valves are adopted for all valves, cost can be drastically reduced.

Further, owing to that two different drive types of valves are used, concurrent defects of a plurality of valves can be prevented from occurring. For example, even when electrical trouble occurs, the thermosensitive valve is not functionally stopped along with the electronic control valve without being influenced thereby. In this case, temperature increase of the entire object can be suppressed compared to a case of being in a state that cooling water cannot be flown concurrently with the two valves, for example. Accordingly, time for troubleshooting can be obtained.

In the present invention, the cooling water control valve apparatus may be used in an engine cooling system which includes a water jacket at a cylinder head side of an engine, a water jacket at a cylinder block side, and a circulation flow passage through which cooling water is circulated against a radiator. Here, the one inlet port is connected to the water jacket at the cylinder head side and the other inlet port is connected to the water jacket at the cylinder block side, and an outlet port which is communicated with the inlet ports through the first passage and/or the second passage is connected to the circulation flow passage at a side to feed cooling water to the radiator.

In general, an oil pan is arranged at a cylinder block side in an engine and lubricant oil to be fed to engine components is stored therein. Viscosity of lubricant oil can be kept low by setting cooling water in the water jacket at the cylinder block side at higher temperature than cooling water in the water jacket at the cylinder head side. Improvement of fuel consumption can be expected by keeping low viscosity of lubricant oil to be fed to pistons and a cylinder liner in the engine (not illustrated). Here, since cooling water in the water jacket at the cylinder block side is not required to be circulated to have high temperature and high valve responsiveness is not required, a flow rate of cooling water can be controlled with the thermosensitive valve. For example, during engine operation except for starting, cooling water in the water jacket at the cylinder block side is at temperature or higher to cause the thermosensitive valve to open, so that the thermosensitive valve is basically opened. Accordingly, compared to a case of using an electronic control valve, there is no specific problem with the thermosensitive valve even with slow operation of opening and closing against temperature variation of cooling water.

On the contrary, it is preferable that cooling water in the water jacket at the cylinder head side is set to lower temperature compared to the cylinder block side. A combustion chamber is arranged at the cylinder head side in the engine. Accordingly, cooling water in the water jacket at the cylinder head side is required to be circulated to have low temperature (appropriate temperature) to keep the combustion chamber at appropriate temperature. Owing to that cooling water in the water jacket at the cylinder head side is kept at appropriate temperature and cooling of the combustion chamber is effectively performed, abnormal combustion of the engine can be suppressed and fuel consumption can be prevented from being worsened. In consideration of a combustion efficiency of the engine and the like, a flow rate of cooling water is required to be adjusted relatively finely to keep engine combustion chamber at appropriate temperature even during engine operation except for starting. In this case, the electronic control valve having superior responsiveness against cooling water temperature is more suitable than the thermosensitive valve. That is, cooling water flow rate can be effectively controlled owing to arrangement of the electronic control valve at the cylinder head side and arrangement of the thermosensitive valve at the cylinder block side, and further, flow rate control can be appropriately performed while achieving cost reduction owing to arrangement of the thermosensitive valve at the cylinder block side.

In the present invention, the cooling water control valve apparatus may be used in the engine cooling system which includes a bypass flow passage to return cooling water out flowing from the water jacket at the cylinder head side of the engine to the water jacket at the cylinder head side and/or the water jacket at the cylinder block side as bypassing the radiator. Here, the bypass flow passage is connected to the first passage without being routed through the electronic control valve, and a return flow passage is arranged between the first passage and the second passage to provide continuous communication between the passages.

According to the above structure, since the bypass flow passage is arranged, cooling water is circulated through the bypass flow passage without being circulated through the circulation flow passage when the electronic control valve and the thermosensitive valve are closed. Since the bypass flow passage is not routed through the radiator, cooling water circulated through the bypass flow passage is heated to have high temperature as being circulated to return to the water jacket of the engine from the water jacket at the cylinder head side without being cooled at the radiator and engine temperature is increased. Accordingly, when cooling water temperature is low, for example, engine temperature is close to temperature at which a fuel consumption efficiency is high by increasing cooling water temperature. Here, owing to that the bypass flow passage is connected to the upstream side of a water pump which is arranged at the cooling water flow passage, circulation through the bypass flow passage can be continuously performed with the water pump.

According to the above structure, the return flow passage is arranged to continuously provide communication between the first passage to which the bypass flow passage is connected and the second passage to which the thermosensitive valve is arranged. Accordingly, apart of cooling water passing through the bypass flow passage is cooling water flowing through the return flow passage after inflowing from the water jacket at the cylinder block side to the other inlet port and passing through the second passage in which the thermosensitive valve is arranged.

That is, cooling water inflowing from the water jacket at the cylinder block side flows into the bypass flow passage after passing through the second passage having the thermosensitive valve, the return flow passage, and the first passage. Accordingly, cooling water flowing from the water jacket at the cylinder block side continuously flows around the thermosensitive valve even when the thermosensitive valve is closed. Consequently, the thermosensitive valve is to be operated in accordance with temperature of cooling water flowing from the water jacket. That is, even in a case that the thermosensitive valve is closed, continuous flow can be generated by circulating cooling water around the thermosensitive valve. Accordingly, it is possible to appropriately perform operation of opening and closing of the thermosensitive valve against temperature variation of cooling water in the water jacket.

By way of comparison, when the return flow passage is not arranged and the thermosensitive valve is closed, cooling water does not flow into the second passage which has the thermosensitive valve and which is arranged from the one inlet port to an outlet port. In this case, since cooling water flow is not generated between cooling water in the water jacket at the cylinder block side and cooling water in the second passage, temperature transmission cannot be performed promptly and temperature of cooling water in the water jacket at the cylinder block side cannot be detected accurately by the thermosensitive valve. Accordingly, large delay occurs at operation of opening and closing of the thermosensitive valve against temperature variation of cooling water in the water jacket at the cylinder block side.

In the present invention, the cooling water control valve apparatus may include a check valve which provides communication between the first passage at the one inlet port side from the electronic control valve and the second passage at the other inlet port side from the thermosensitive valve and which allows cooling water to flow from the first passage to the second passage.

According to the above structure, the check valve allows cooling water to flow from the first passage to the second passage.

Here, when pressure at the first passage is smaller than that at the second passage, the check valve is not opened and cooling water does not flow from the first passage to the second passage through the check valve.

Basically, pressure difference for opening the check valve is generated in a case that the electronic control valve in the first passage is closed even while the thermosensitive valve in the second passage is opened. For example, in a case that the electronic control valve is kept closed owing to locking of the electronic control valve in the first passage even while temperature of cooling water in the water jacket at the cylinder head side exceeds temperature at which the electronic control valve is to be opened, pressure at the first passage is increased and the check valve is opened with enlarged pressure difference between the first passage and the second passage. Accordingly, cooling water flows from the first passage to the second passage, and then, the cooling water flows toward the radiator after passing through the opened thermosensitive valve.

According to the above structure, it is possible to prevent engine (cylinder head) temperature increase caused by non-feeding of cooling water at the electronic control valve side to the radiator, for example, when the electronic control valve fails. That is, the cooling water control valve apparatus has a fail-safe function for the electronic control valve. Here, opening pressure of the check valve is set to be suitable for the abovementioned fail-safe function. Further, it is also possible to provide a fail-safe function for the thermosensitive valve depending on check valve arrangement. For example, owing to arrangement of a check valve which allows cooling water to flow from the second passage to the first passage with pressure difference between the first passage and the second passage, cooling water at the cylinder block side can be reliably circulated even when the thermosensitive valve fails.

Effects of the Invention

According to the present invention, flow rates of cooling water in two lines of cooling water passages can be controlled independently with a single cooling water control valve apparatus. Here, for example, a thermosensitive valve is used for controlling a flow rate of cooling water at a side requiring a relatively stable flow rate to keep cooling water at high temperature. Meanwhile, an electronic control valve is used for controlling a flow rate of cooling water at a side requiring relatively frequent adjustment in accordance with an engine combustion state to keep cooling water at low temperature (appropriate temperature). In this case, cost reduction can be achieved compared to a case of using two electronic control valves and flow rate adjustment of cooling water in two lines can be appropriately performed.

DESCRIPTION OF THE EMBODIMENTS

In the following, embodiments of the present invention will be described with reference to the drawings.

Figure 1:
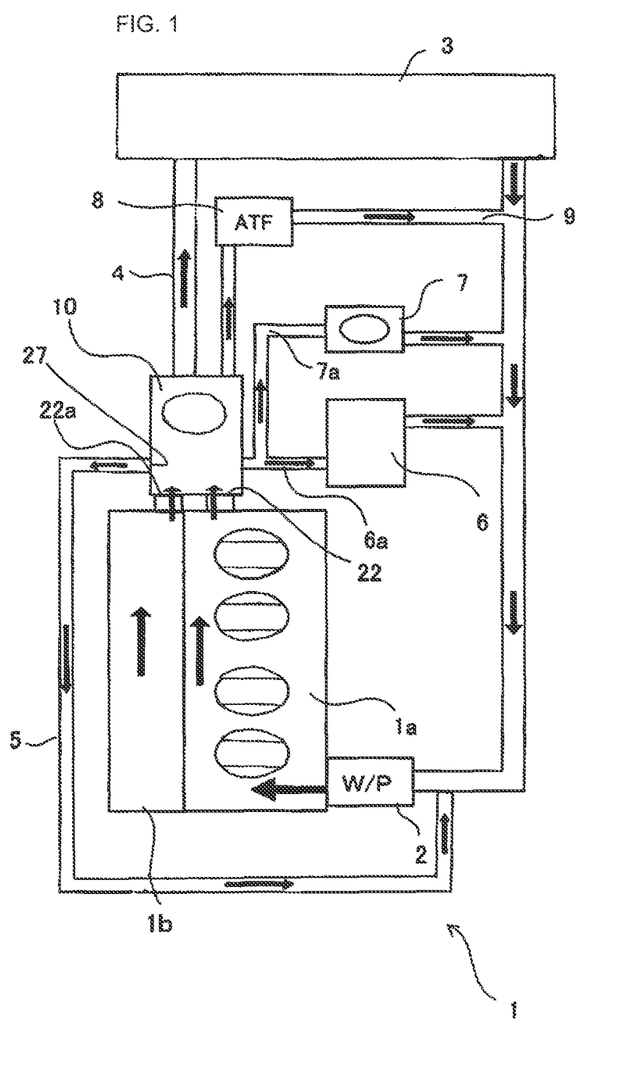
FIG. 1 is a cooling circuit diagram schematically illustrating an engine cooling system in which a cooling water control valve apparatus of an embodiment of the present invention is used.
Figure 2:
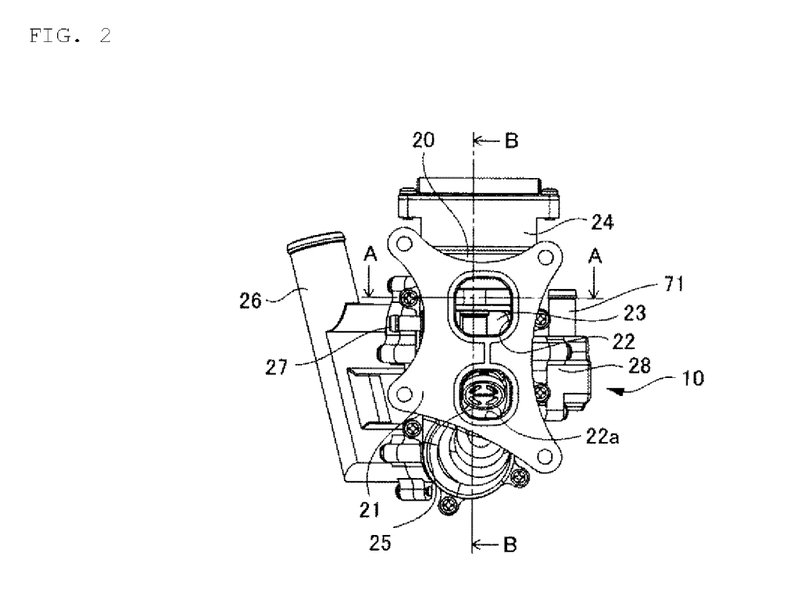
FIG. 2 is a bottom view illustrating the cooling water control valve apparatus.
Figure 3:
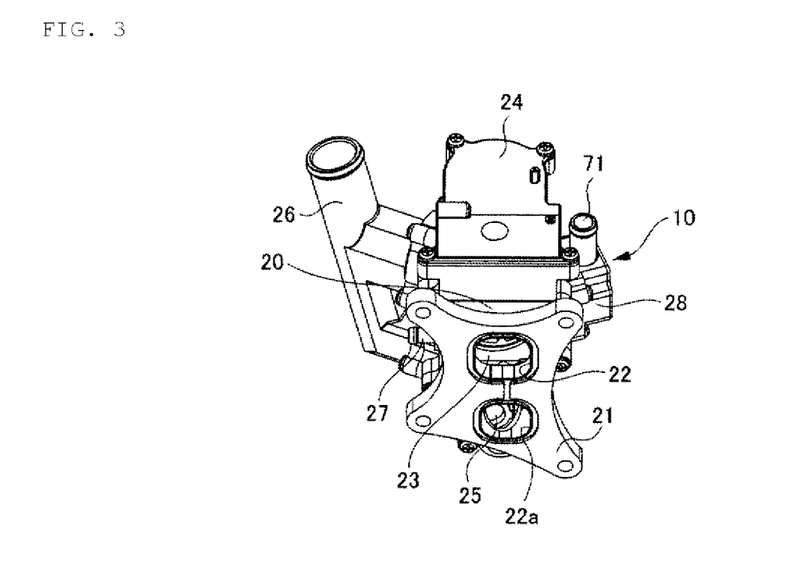
FIG. 3 is a perspective view illustrating the cooling water control valve apparatus.
Figure 4:
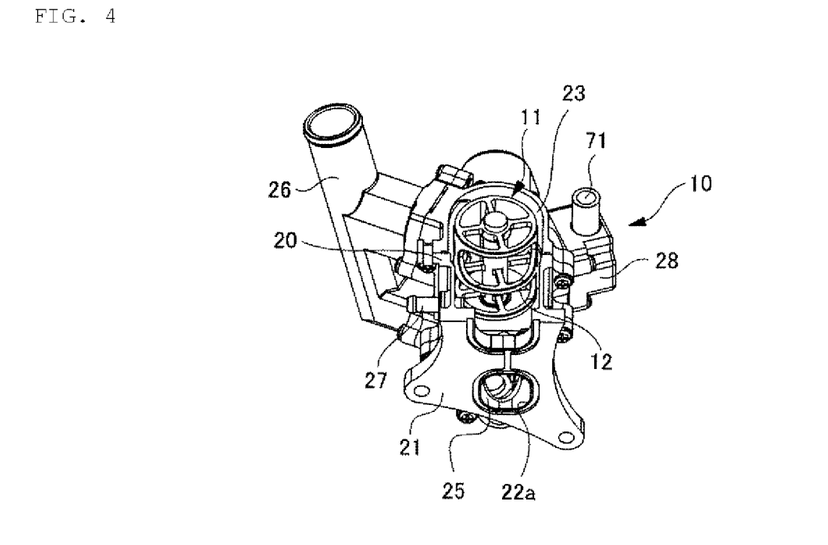
FIG. 4 is a sectional perspective view at A-A in FIG. 2.
Figure 5:
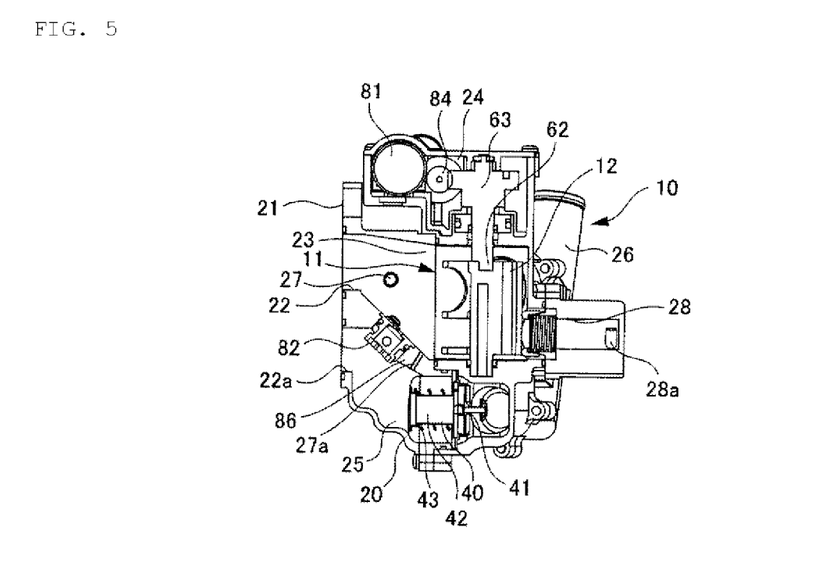
FIG. 5 is a sectional view at B-B in FIG. 2.

As illustrated in FIG. 1, an engine cooling system in which a cooling water control valve apparatus 10 of an embodiment includes the cooling water control valve apparatus 10 which is arranged in communication with a water jacket 1a at a cylinder head side of an engine 1 and a water jacket 1b at a cylinder block side of the engine 1, a water pump 2 which circulates cooling water as being arranged in communication with the water jackets 1a, 1b, a radiator 3 which cools cooling water, and a circulation flow passage 4 for circulating cooling water from the water jackets 1a, 1b to the water jackets 1a, 1b through the cooling water control valve apparatus 10, the radiator 3 and the water pump 2. Here, as described later, the cooling water control valve apparatus 10 is capable of independently controlling a flow rate of outflow from the water jacket 1a at the cylinder head side to a section of the circulation flow passage 4 toward the radiator 3 side and a flow rate of outflow from the water jacket 1b at the cylinder block side to a section of the circulation flow passage 4 toward the radiator 3 side.

Further, in the engine cooling system of the present embodiment, a bypass flow passage 5 is connected to the upstream side of the water pump 2 in a state of bypassing the radiator 3, that is, without being routed through the radiator 3. Specifically, the bypass flow passage 5 is connected to a vicinity of an inlet port of the water pump 2 at the upstream side of the inlet port of the water pump 2. Accordingly, cooling water is to be returned to the water jackets 1a, 1b of the engine 1 via the water pump 2 as passing through the bypass flow passage 5 even if the circulation flow passage 4 is closed by the cooling water control valve apparatus 10. Thus, cooling water in the bypass flow passage 5 is to be circulated by the water pump 2. Here, the water pump 2 is driven with a drive force of the engine 1. Accordingly, the water pump 2 is in operation during operation of the engine 1.

According to the above, for example, in a case that temperature of cooling water is low at the time of engine starting or the like, cooling water is to be heated with generated heat of the engine 1 without being cooled by the radiator 3 owing to that the circulation flow passage 4 is closed by the cooling water control valve apparatus 10.

Further, in addition to the circulation flow passage 4 and the bypass flow passage 5, a subsidiary flow passage 6a which passes through a heater 6 and a subsidiary flow passage 7a which passes through a throttle 7 (a water jacket for a throttle) are arranged between the cooling water control valve apparatus 10 and the water pump 2. Here, each flow passage is formed by piping, for example.

Further, an AFT cooling device 8 which performs cooling of automatic transmission fluid (ATF) is arranged. A flow passage 9 circulating through the ATF cooling device 8 is merged with the circulation flow passage 4 at a section routing from the radiator 3 toward the water pump 2. Here, the flow passage 9 may be routed through a later-mentioned electronic control valve 11 in the cooling water control valve apparatus 10. Alternatively, the flow passage 9 may be routed from the water jacket 1a to the water pump 2 without being routed through a valve, so that cooling water is continuously circulated through the flow passage 9 during engine operation.

The cooling water control valve apparatus 10 of the present embodiment is attached across a boundary section between the water jacket 1a at the cylinder head side of the engine 1 and the water jacket 1b at the cylinder block side.

An opening portion through which cooling water is discharged is formed respectively at the water jacket 1a and the water jacket 1b to which the cooling water control valve apparatus 10 is to be attached.

As illustrated in FIGS. 2 to 5, the cooling water control valve apparatus 10 is provided with a casing 20 which is attached to sections of the opening portions of the water jackets 1a, 1b. The casing 20 is provided with a flange portion 21 including a first inlet port 22 which is communicated with the opening portion of the water jacket 1a and a second inlet port 22a which is communicated with the opening portion of the water jacket 1b.

Further, the casing 20 is provided with a first passage portion 23 which includes an inner space communicated with the first inlet port 22 of the flange portion 21 and in which the electronic control valve (a rotary-type valve) 11 having a rotor 12 is arranged, a drive chamber portion 24 in which a motor 81 as drive means to rotatively drive the rotor 12 is arranged, a second passage portion 25 in which a thermosensitive valve 40 is arranged and which is communicated with the second inlet port 22a of the flange portion 21, a main outlet portion 26 which is communicated with the first passage portion 23 and the second passage portion 25 as being connected to the circulation flow passage 4, a bypass outlet portion 27 which is connected to the bypass flow passage 5 in a state of being branched from the first passage portion 23, and subsidiary outlet portions 28, 28a which are connected to the subsidiary flow passages 6a, 7a.

In the cooling water control valve apparatus 10, a groove in which a seal member is arranged is formed around the first inlet port 22 and the second inlet port 22a. Further, the first passage portion 23 which is communicated with the water jacket 1a at the cylinder head side via the first inlet port 22 is connected to the main outlet portion 26 and the subsidiary outlet portions 28, 28a so that cooling water out flowing from the water jacket 1a reaches the main outlet portion 26 and the subsidiary outlet portions 28, 28a as passing through the electronic control valve 11. Further, the bypass outlet portion 27 is arranged at a section of the first passage portion 23 at the first inlet port 22 side from the electronic control valve 22. Accordingly, cooling water in the water jacket 1a at the cylinder head side is discharged from the bypass outlet portion 27 to the bypass flow passage 5 with operation of the water pump 2 regardless of opening and closing of the electronic control valve 11.

The electronic control valve 11 is capable of varying flow rates of cooling water passing through the circulation flow passage 4 and the subsidiary flow passages 6a, 7a from the water jacket 1a at the cylinder head side (capable of opening and closing) in accordance with a rotation angle of the rotor 12. With the rotation angle, the rotor 12 is capable of opening and closing the subsidiary flow passage 6a for the heater 6 and the subsidiary flow passage 7a for the throttle 7 in a state that the circulation flow passage 4 is closed. Accordingly, the flow rates of cooling water for the subsidiary flow passages 6a, 7a and the like can be varied concurrently with adjustment of the flow rate of cooling water for the circulation flow passage 4. The rotor 12 of the present embodiment is arranged so that rotation angles of the rotor 12 with which the subsidiary flow passages 6a, 7a can be varied between being closed and being opened are included in a range of rotation angles thereof with which the circulation flow passage 4 is kept in a closed state.

For example, the rotor 12 may be provided with an opening portion which is communicated with the circulation flow passage 4 as being elongated in the circumferential direction. In a state that cooling water can pass through the opening portion, the rotor 12 may be rotatable to cause a state of having communication of opening portions for the subsidiary flow passages 6a, 7a with the subsidiary flow passages 6a, 7a and a state of without having the communication thereof. Here, it is also possible that a plurality of opening portions for the circulation flow passage 4 is arranged at the rotor 12 side by side in the circumferential direction. According to the above structure, the subsidiary flow passages 6a, 7a can be opened and closed in a state that the circulation flow passage 4 is opened.

Further, for example, a mechanism to rotate the rotor 12 includes a gear train structured with a gear 63 which is integrally rotated with a rotational shaft 62 of the rotor 12 and an intermediate gear portion 84 which coaxially includes a gear engaged with the gear 63 and a gear engaged with a drive gear (not illustrated) arranged at the motor 81 being a stepping motor. The gear train (power transmitting mechanism) transmits a drive force from the motor 81 to the rotor 12.

Further, the first passage portion 23 and the second passage portion 25 are basically partitioned by a partition wall 86. Accordingly, cooling water inflowing from the first inlet port 22 passes through the electronic control valve 11 and cooling water inflowing from the second inlet port 22a passes through the thermosensitive valve 40.

The thermosensitive valve 40 includes a valve body portion 41 which performs opening and closing between the second inlet port 22a of the second passage portion 25 and the main outlet portion 26, a temperature detecting medium 42 which drives the valve body portion 41 based on temperature variation, and a return spring 43 which urges the valve body portion 41 to the closing side.

The temperature detecting medium 42 is formed with thermo-wax, for example. Here, it is also possible to adopt a thermostat, shape-memory alloy or the like as long as being capable of opening and closing the valve at set temperature by being displaced with temperature. The temperature detecting medium 42 causes the second inlet port 22a and the main outlet portion 26 to be communicated by opening the valve body portion 41 when temperature becomes higher than the set temperature (range) and closes communication between the second inlet port 22a and the main outlet portion 26 by closing the valve body portion 41 when temperature becomes lower than the set temperature (range). Here, the temperature detecting medium 42 includes thermo-wax accommodated in a case and a known built-in mechanism to drive the valve body portion 41 in accordance with expansion and contraction of the thermo-wax.

The return spring 43 urges the valve body portion 41 to the closing side. Accordingly, in a case that the valve body portion 41 is in a state of being free to be opened and closed caused by breakage of the temperature detecting medium 42, for example, the valve body portion 41 is closed.

When temperature of cooling water becomes to predetermined temperature or higher, the valve body portion 41 is driven against an urging force of the return spring 43 with expansion of the thermo-wax which is accommodated in the case of the temperature detecting medium 42.

The bypass outlet portion 27 is formed at the casing 20 as being branched from the first passage portion 23. A return flow passage 27a is formed at the partition wall 86 which partitions the first passage portion 23 and the second passage portion 25. Accordingly, a part of cooling water flowing from the water jacket 1b toward the second passage portion 25 flows to the bypass outlet portion 27 through the return flow passage 27a and the first passage portion 23. According to the above, in a state that at least the thermosensitive valve 40 is closed, a part of cooling water flowing through the bypass flow passage 5 is cooling water outflowing from the second passage portion 25 having the thermosensitive valve 40, so that cooling water passing around the temperature detecting medium 42 of the thermosensitive valve 40 flows through the bypass flow passage 5.

In particular, the return flow passage 27a is opened at a section of the second passage portion 25 where the temperature detecting medium 42 of the thermosensitive valve 40 is located, so that cooling water from the water jacket 1b flows toward the temperature detecting medium 42 of the second passage portion 25.

Here, in a state that the thermosensitive valve 40 is closed and the electronic control valve 11 is closed as well when the water pump 2 is operated with starting of the engine 1, cooling water in the first passage portion 23 at the first inlet port 22 side being at the upstream side from the electronic control valve 11 is sucked by the water pump 2 through the bypass outlet portion 27 and the bypass flow passage 5. Accordingly, pressure at the first passage portion 23 side becomes lower than that at the second passage portion 25 side, so that cooling water flows through the return flow passage 27a to the first passage portion 23 side from a section of the second passage portion 25 where the temperature detecting medium 42 is located.

That is, in a state that the electric control valve 11 and the thermosensitive valve 40 are closed, cooling water flows from the second passage portion 25 side to the first passage portion 23 side through the return flow passage 27a. Accordingly, cooling water in the water jacket 1b inflows to the second passage portion 25 through the second inlet port 22a. Further, in a state that the electronic control valve 11 is opened while the thermosensitive valve 40 is closed, the first passage portion 23 side has lower pressure than the second passage portion 25 side. Accordingly, cooling water flows through the return flow passage 27a to the first passage portion 23 side from a section of the second passage portion 25 where the temperature detection medium 42 is located.

Thus, according to the cooling water control valve apparatus 10, even in a case that the thermosensitive valve 40 is closed, temperature of cooling water in the water jacket 1b is promptly transmitted to the temperature detecting medium 42 of the thermosensitive valve 40 owing to cooling water flowing through the bypass flow passage 5. Accordingly, the thermosensitive valve 40 can be operated to the opening side in accordance with temperature increase of cooling water in the water jacket 1b.

Further, a check valve (one-way valve) 82 is arranged at the partition wall 86 between the first passage portion 23 and the second passage portion 25.

When the thermosensitive valve 40 is opened in a case that the electronic control valve 11 is kept in a closed state with a defect thereof, the check valve 82 causes cooling water to flow from the first passage portion 23 side to the second passage portion 25 side owing to pressure being higher than predetermined opening pressure. For example, with occurrence of a defect such that the electronic control valve 11 is not opened for some reason even when temperature of cooling water in the water jacket 1a at the cylinder head side is increased, temperature at the water jacket 1a side is further increased. Accordingly, pressure at the first passage portion 23 side becomes higher than that at the second passage portion 25 side, so that the check valve 82 is opened.

Further, in the cooling water control valve apparatus 10, the subsidiary outlet portions 28, 28a are independently arranged into two lines and an outlet pipe 71 is arranged respectively thereto. Here, an outlet pipe for the subsidiary outlet portion 28a is not illustrated.

With the cooling water control valve apparatus 10 as described above, when cooling water is circulated using the circulation flow passage 4 which is arranged between the radiator 3 and the water jacket 1a at the cylinder head side as well as the water jacket 1b at the cylinder block side, flow rates of cooling water of the water jackets 1a, 1b are controlled at the outlet side by the cooling water control valve apparatus 10. According to the above, basically, in a case that flow rates of cooling water of the water jackets 1a, 1b are restricted at the outlet side, a flow rate at the bypass flow passage 5 side is increased and an amount of cooling water to be cooled at the radiator 3 is decreased. Accordingly, temperature of cooling water in the water jackets 1a, 1b is increased.

As described above, the cooling water control valve apparatus 10 is provided with the first passage portion 23 which is communicated with the water jacket 1a at the cylinder head side through the first inlet port 22 and the second passage portion 25 which is communicated with the water jacket 1b at the cylinder block side through the second inlet port 22a. In addition, the electronic control valve 11 is arranged at the first passage portion 23 and the thermosensitive valve 40 is arranged at the second passage portion 25.

According to the above, it is possible to control an outflowing amount of cooling water from the water jacket 1a at the cylinder head side to the radiator 3 side and an outflowing amount of cooling water from the water jacket 1b at the cylinder block side to the radiator 3 side, respectively in an independent manner. That is, flow rates of cooling water in two cooling water flow passages can be separately controlled by the single cooling water control valve apparatus 10.

In general, owing to that temperature of cooling water in the water jacket 1b at the cylinder block side is set higher than that of cooling water in the water jacket 1a at the cylinder head side during engine operation, viscosity of lubricant oil is kept low and sliding friction of engine components is reduced. Accordingly, fuel consumption can be improved. In addition, to keep a combustion chamber at appropriate temperature for further improvement of fuel consumption, it is required to set cooling water in the water jacket 1a at the cylinder head side at low temperature (appropriate temperature). With the water jacket 1a having low temperature, there may be a case that outflow of cooling water is discontinued to increase cooling water temperature even during engine operation. Accordingly, relatively accurate control of temperature is required. In a case that a flow rate of cooling water is controlled by the electronic control valve 11, the flow rate of cooling water can be controlled by determining opening and closing or an opening degree of the electronic control valve 11 based on a control program or control setting. Responsiveness of the electronic control valve 11 against cooling water temperature can be quicker than that of the thermosensitive valve 40.

On the other hand, temperature of cooling water in the water jacket 1b at the cylinder block side is kept higher compared to the cylinder head side. Here, there is high possibility that the valve is kept opened after temperature in the water jacket 1b is increased with engine operation. Accordingly, cooling water temperature can be controlled sufficiently with the thermosensitive valve 40. In this case, cost reduction can be achieved compared to a case that electric control valves are used for both of the water jacket 1a at the cylinder head side and the water jacket 1b at the cylinder block side.

Further, in the cooling water control valve apparatus 10, the bypass flow passage 5 is structured to circulate cooling water not of the water jacket 1b at the cylinder block side but of the water jacket 1a at the cylinder head side. That is, the cooling water control valve apparatus 10 is structured to circulate cooling water of the water jacket 1a at the cylinder head side which is required to be set at lower temperature than that at cylinder block side.

Further, the bypass outlet portion 27 as an end portion of the bypass flow passage 5 from which cooling water from the water jacket 1a is discharged is arranged between the electronic control valve 11 and the first inlet port 22 of the first passage portion 23 of the cooling water control valve apparatus 10. Furthermore, the narrow return flow passage 27a which provides communication between the first passage portion 23 and the second passage portion 25 is arranged at the partition wall 86 arranged between the first passage portion 23 and the second passage portion 25. Accordingly, as described above, cooling water flows even when the thermosensitive valve 40 is closed at the second passage portion 25.

According to the above, it is structured that the thermosensitive valve 40 can detect temperature of cooling water in the water jacket 1b owing to flow of cooling water. Therefore, the thermosensitive valve 40 is capable of being opened and closed without delay against temperature variation of cooling water in the water jacket 1b. Here, the inner diameter of the return flow passage 27a is smaller than the inner diameter of the bypass outlet portion 27.

Further, the abovementioned check valve 82 is arranged at the partition wall 86 between the first passage portion 23 and the second passage portion 25 to allow flowing of cooling water from the first passage portion 23 to the second passage portion 25 and to prevent flowing in the opposite direction. Accordingly, in a case that the electronic control valve 11 is kept closed as being incapable of being opened in the first passage portion 23 owing to occurrence of a defect of some sort at the electronic control valve 11 (e.g., locking of the rotor 12), the check valve 82 is opened and cooling water flows from the first passage portion 23 to the second passage portion 25. According to the above, in a case that temperature of cooling water in the water jacket 1a at the cylinder head side is increased without opening of the electronic control valve 11 by any chance, cooling water in the water jacket 1a can be cooled as being fed to the radiator 3 through the thermosensitive valve 40.

Further, owing to usage of the rotary type electronic control valve 11, it is possible to control the subsidiary flow passages 6a, 7a other in addition to the circulation flow passage 4. Accordingly, the cooling water control valve apparatus 10 can control flow rates of cooling water at more lines.

Here, in the cooling water control valve apparatus 10, the first inlet port 22 is connected to the water jacket 1a at the cylinder head side and the second inlet port 22a is connected to the water jacket 1b at the cylinder block side. However, in a case that an engine has another water jacket which is further separated, the first inlet port 22 or the second inlet port 22a may be connected to the separated water jacket. In the above, description is performed on that the cooling water control valve apparatus 10 is applied to the engine cooling system illustrated in FIG. 1. However, it is also possible to be applied to an engine cooling system other than the one illustrated in FIG. 1.

DESCRIPTION OF REFERENCES

1 Engine
1a Water jacket at cylinder head side
1b Water jacket at cylinder block side
3 Radiator
4 Circulation flow passage
5 Bypass flow passage
10 Cooling water control valve apparatus
11 Electronic control valve
22 First inlet port (One inlet port)
22a Second inlet port (Other inlet port)
23 First passage portion (First passage)
25 Second passage portion (Second passage)
27 Bypass outlet portion 27a Return flow passage
40 Thermosensitive valve
82 Check valve
86 Partition wall

The invention claimed is:

1. A cooling water control valve apparatus which adjusts a flow rate of cooling water for an engine cooling system which includes a water jacket at a cylinder head side of the engine, a water jacket at a cylinder block side of the engine, a circulation flow passage through which cooling water is circulated from the water jackets toward a radiator, a bypass flow passage to return cooling water outflowing from the water jacket at the cylinder head side of the engine to the water jacket at the cylinder head side and/or the water jacket at the cylinder block side as bypassing the radiator, comprising:

a casing including a first inlet port, a second inlet port, a first passage communicated with the first inlet port, a second passage communicated with the second inlet port, a main outlet portion communicated with the first passage and the second passage, and a bypass outlet portion branches from the first passage, and a partition wall partitioning the first passage and the second passage;

an electrical control valve which is arranged in the first passage and which adjusts a flow rate of cooling water flowing through the first passage with electronic control, wherein the bypass outlet portion is arranged at the casing so as to branch from the first passage at a position located on a first inlet port side of the electrical control valve such that cooling water flows in the first passage when the electrical control valve is closed; and a thermosensitive valve which is arranged in the second passage which adjusts a flow rate of cooing water flowing through the second passage owing to displacement of a temperature detecting medium with temperature, wherein the casing further includes a return flow passage disposed in the partition wall to provide continuous communication between the first passage and the second passage such that cooling water flows from the second passage to the first passage when the thermosensitive valve is closed, the return flow passage is connected to the second passage at a position located on a second inlet port side of the thermosensitive valve such that cooling water flows from the second passage to the first passage, flows in the first passage and to the bypass outlet portion when the thermosensitive valve and the electric control valve are both closed.

2. The cooling water control valve apparatus according to claim 1, comprising a check valve which is disposed in the partition wall and provides communication between the first passage at the first inlet port side of the electrical control valve and the second passage at the second inlet port side of the thermosensitive valve and which allows cooling water to flow from the first passage to the second passage when the electric control valve is kept in a closed state with a defect thereof.

* * * * *